A. P. DIESCHER.
MOLD SEPARATING DEVICE.
APPLICATION FILED JUNE 11, 1920.

1,383,608.  Patented July 5, 1921.

WITNESSES
J. Herbert Bradley

INVENTOR
August P. Diescher
by Dammi S. Wolcott
atty

UNITED STATES PATENT OFFICE.

AUGUST P. DIESCHER, OF PITTSBURGH, PENNSYLVANIA.

MOLD-SEPARATING DEVICE.

1,383,608. Specification of Letters Patent. Patented July 5, 1921.

Application filed June 11, 1920. Serial No. 388,313.

*To all whom it may concern:*

Be it known that I, AUGUST P. DIESCHER, residing at Pittsburgh, in the county of Allegheny and State of Pennsylvania, a citizen of the United States, have invented or discovered certain new and useful Improvements in Mold-Separating Devices, of which improvements the following is a specification.

One of the difficult and unpleasant operations involved in the manufacture of some types of automobile tires is the separation of the tires from the molds in which they are vulcanized. In order to avoid the use of a large number of molds and the expense and time incident to the employment of hand labor, the separation of the tires from the molds should be effected mechanically immediately after removal of the molds from the treating chamber. In addition to the difficulty of handling the heavy mold sections, and cores and tires, the adherence of the tires to the mold surfaces in many cases increases the difficulty of the opening operation, the adherence being in some instances so great that it requires the use of pinch bars and other tools to pry the sections loose from the tire. And further, in order to prevent injury to the tires during such operation, detachment of the sections of the mold from the tire should preferably be progressive, that is, begin at one point and proceed gradually in both directions therefrom.

The object of the invention described herein is to provide mechanism whereby power may be employed in the separation of the tire from the mold sections and effect such separation in a manner that will avoid injury to the tire. The invention is hereinafter more fully described and claimed.

Figure 2:
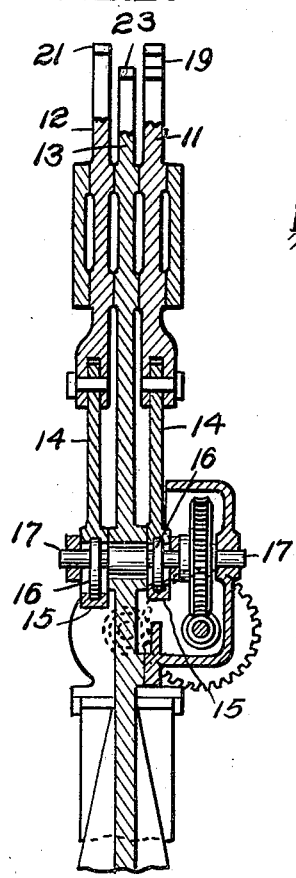
Figure 1:
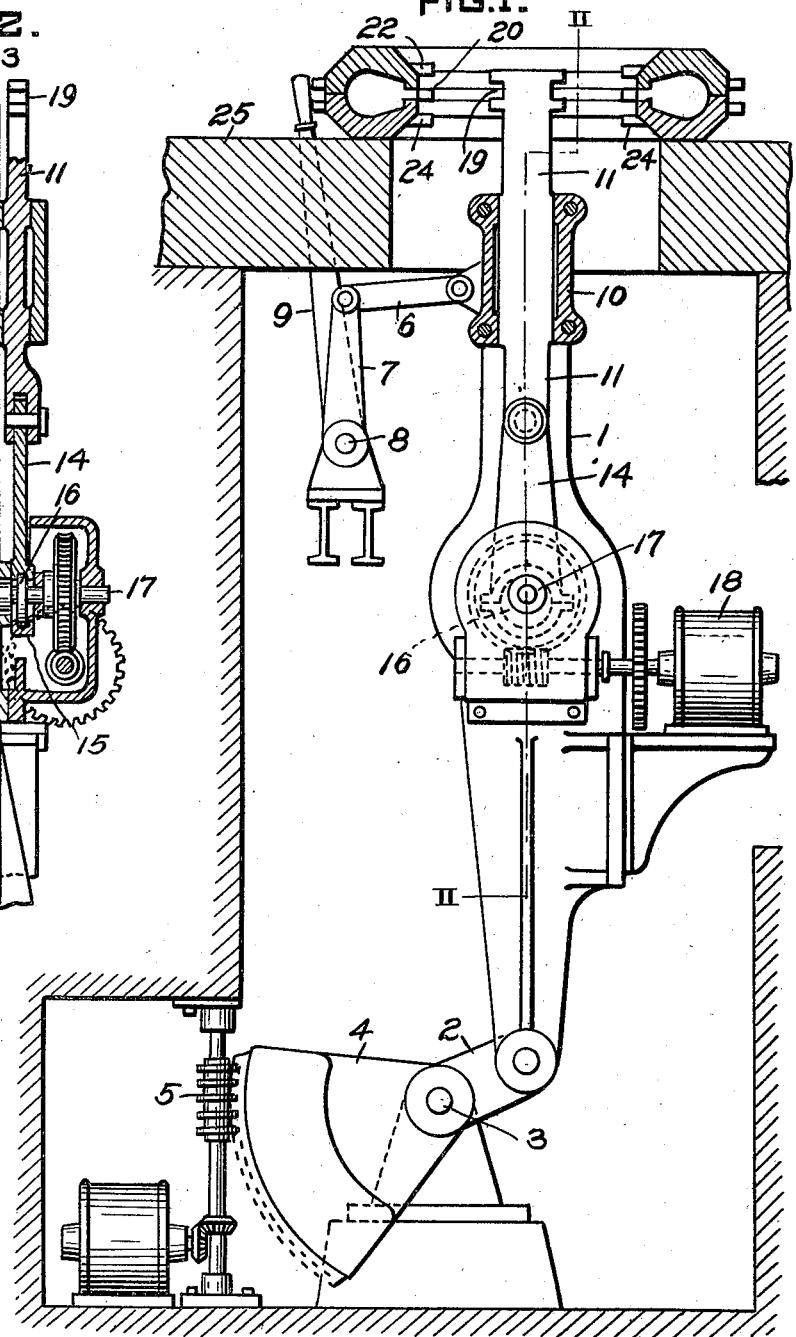

In the accompanying drawings forming a part of this specification, Figure 1 is a side elevation of a mold opening mechanism embodying the improvements claimed herein; and Fig. 2 is a sectional elevation on a plane indicated by the line II—II, Fig. 1.

In the practice of the invention the mechanism embodies a plurality of members, some of which are movable, relative to each other, and to a stationary member or members. The members are provided with toes or other suitable means for engaging the mold sections and the internal rim of the core on which the tires are built up and vulcanized. The members which are power driven are arranged in a suitable frame adapted to be shifted vertically and horizontally to bring the toes on the members into engagement with the mold sections and core. After the toes have been brought into engagement with the mold sections and core, the members carrying the toes are operated in such manner that the separating action will begin at a point and continue progressively from such point.

A desirable embodiment of the improvement above described is shown and consists of a movable frame 1 having its lower end pivotally connected to an arm 2 on a shaft 3 to which is also connected a weighted arm 4 to counterbalance the frame 1 and parts carried thereby.

While any suitable means may be employed for turning the shaft 3 for raising and lowering the frame 1, it is preferred to employ a motor driven worm 5 intermeshing with teeth on the periphery of the sector-shaped counterweight for the reason that such mechanism is not only effective for shifting the frame vertically but also for locking it at any point in its vertical movement. Any suitable means may be employed for shifting the frame laterally for the purpose of causing the toes to engage the mold section and the inner rim of the core as hereinafter described, such for example, as that shown in Fig. 1 consisting of an operating lever 9 having one end secured to the shaft 8 on which is also secured an arm 7 connected to the frame by the link 6. The frame 1 is provided at its upper end with a guiding head 10 through which pass bars 11 and 12, said bars being associated with a third bar 13 which is movable only with the frame. While any suitable means may be employed for shifting the bars 11 and 13 in the manner hereinafter described, the construction shown has been found suitable for that purpose and consists in connecting the lower end of the movable bars 11 and 12 to pitmen 14 which are provided with yokes 15 surrounding eccentrics 16 on a shaft 17 mounted in suitable bearings in the frame and rotated by the motor 18 also carried by the frame and by any other suitable means. These eccentrics 16 are so secured on the shaft 17 that one will operate to shift the pitmen and bar connected thereto in advance of the other bar as hereinafter described. The bar 11 is provided at, or adjacent to, its upper end and on opposite sides with notches 19 for the reception of the inner rim 20 of the annular core carrying the tires. The other movable bar 12 is provided with toes 21 on opposite sides and adapted to pass under lugs 22 on the upper section of the mold while the stationary bar 13 is provided with toes 23 adapted to project above the lugs 24 on the lower mold section when the mechanism has been shifted for operation in opening a mold as hereinafter described.

As clearly shown in Fig. 1, the above mechanism is so arranged relative to a supporting table or bed 25 that the operative portions will project up through an opening in such bed which serves as a support for the mold during the opening operation. The mold being in position shown, the frame 1 is raised so as to bring the upper portions of the bars 11, 12 and 13 in position to engage the lugs on the mold section and the rim of the core when shifted laterally which is effected by means of the lever 9. When so shifted the rim 20 of the core will enter the notch on one side of the bar 11 and at the same time the toe 21 will pass in under the lug 22 on the upper mold section and the toe 23 of the stationary bar will pass above the lugs 24 on the lower mold section. The parts of the mechanism thus in engagement with the mold and core, the motor 18 is operated to turn the shaft 17 and the eccentrics 16 being properly set for that purpose, the bar 12 is first moved up lifting the upper mold section at one side while the core and lower portion of the mold are held stationary. Either during, or immediately after, the completion of the upward movement of the bar 12, the bar 11 will be moved up by its eccentric, thereby loosening the tire from the lower mold section which is held stationary by the toe 23. It will be observed that in this operation the separation of the upper mold section from the core and the latter from the lower mold section begins at one side and as the upward movement continues the separation will be progressive in both directions around the mold toward the opposite side. If the operation of this mechanism on one side of the mold has not completed the separation of the core and mold sections, the frame can be shifted across the opening in the mold so as to engage the mold sections and core at the diametrically opposite point and then with the operation of the eccentric complete separation will be effected.

It is characteristic of the mechanism described and claimed herein that it can be employed for separation of the tire from molds varying widely in diameter and transverse dimensions. It frequently happens that molds varying widely in dimensions are charged in the same treating chamber, but as there is no limitation to the vertical and lateral movements of the frame, it is immaterial in what order the various sized molds are operated on.

I claim herein as my invention:

1. In a machine for separating mold sections from an inclosed core, the combination of three members adapted to engage respectively the mold sections and the core and means for shifting two members relative to each other and to the third member.

2. In a machine for separating mold sections from an inclosed core, the combination of a movable frame, members adapted to engage respectively the mold sections and the core, two of said members being movably mounted in said frame, means for shifting the frame and means for shifting the movable members relative to each other and to the third member.

3. In a machine for separating mold sections from an inclosed core the combination of a frame movable laterally and longitudinally, members mounted in the frame and adapted to engage the respective mold sections, means for shifting the frame and means for moving one member relative to the other members.

4. In a machine for separating mold sections from an inclosed core the combination of a frame movable longitudinally and laterally, three members carried by the frame and adapted to engage respectively the mold sections and the core, means for shifting the frame and means for moving two members to separate a mold section from the core and the core from the other mold section.

5. In a machine for separating mold sections from a core inclosed thereby, the combination of a movable frame provided with means for engaging the mold section, bars provided with toes or projections for engaging the other mold section and the core movably mounted in the frame, means for shifting the frame and means carried by the frame for shifting the bars.

6. In a machine for separating mold sections from a core inclosed thereby, the combination of a movable frame provided with means for engaging a mold section, bars movably mounted in the frame and adapted to engage a mold section and the inclosed core, means for shifting the frame and means for moving the bars in succession relative to each other.

7. In a machine for separating mold sections from an inclosed core, the combination of means for holding stationary one of the parts to be operated on and means for moving the other parts in succession to separate them from the stationary part and from each other.

8. In a machine for separating mold sections from a core inclosed thereby, the combination of means for moving one of the mold sections and the core in succession and means for holding the other mold sections stationary.

In testimony whereof I have hereunto set my hand.

AUGUST P. DIESCHER.